United States Patent

Kajino et al.

[11] Patent Number: 5,337,802
[45] Date of Patent: Aug. 16, 1994

[54] VEHICLE AIR CONDITIONER HAVING DRIVER AND PASSENGER UNITS WHICH OPERATE INDEPENDENTLY OF ONE ANOTHER

[75] Inventors: Yuuichi Kajino, Nagoya; Koichi Ban, Tokai; Yuuji Honda, Kariya; Hikaru Sugi, Nagoya, all of Japan

[73] Assignee: Nippondenso Co., Ltd., Kariya, Japan

[21] Appl. No.: 924,883

[22] Filed: Aug. 6, 1992

[30] Foreign Application Priority Data

Aug. 9, 1991 [JP] Japan .................. 3-200451

[51] Int. Cl.⁵ .................. F25B 29/00; B60H 3/00
[52] U.S. Cl. .................. 165/22; 165/43; 236/91 C; 454/75
[58] Field of Search .............. 165/43, 42, 22; 454/75; 236/91 C

[56] References Cited

U.S. PATENT DOCUMENTS

| | | | |
|---|---|---|---|
| 4,890,460 | 1/1990 | Takasi et al. | 165/43 |
| 4,898,325 | 2/1990 | Sakurada | 165/43 |
| 5,020,424 | 6/1991 | Iida et al. | 165/43 |
| 5,056,421 | 10/1991 | Iida | 236/91 C |
| 5,181,654 | 1/1993 | Yoshimi et al. | 236/91 C |
| 5,186,682 | 2/1993 | Iida | 236/91 C |
| 5,199,485 | 4/1993 | Ito et al. | 236/91 C |

FOREIGN PATENT DOCUMENTS

| | | | |
|---|---|---|---|
| 0051615 | 4/1980 | Japan | 165/43 |
| 0086819 | 7/1981 | Japan | 236/91 C |
| 0205219 | 12/1982 | Japan | 236/91 C |
| 58-133911 | 8/1983 | Japan . | |
| 59-156814 | 9/1984 | Japan . | |
| 0174314 | 9/1985 | Japan | 454/75 |
| 63-3767 | 1/1988 | Japan . | |
| 0074709 | 4/1988 | Japan | 454/75 |
| 0074710 | 4/1988 | Japan | 454/75 |

Primary Examiner—John K. Ford
Attorney, Agent, or Firm—Cushman, Darby & Cushman

[57] ABSTRACT

An air-conditioning apparatus for a vehicle having separate units for a driver's seat and an assistant driver's seat. Each of the units has first and second vent outlets opened to a cabin near the lateral side of the cabin and the center side of cabin. A sensor is provided for detecting an amount of the solar radiation. The sensor also can detect an azimuth angle and elevation angle of the sun with respect to the direction of movement. An increase in the thermal load due to the solar radiation is determined, and the calculated increase is allocated to the first and second vent outlets by changing the temperature and/or the amount of the air discharged from the respective outlets, so that the passenger can feel a uniform temperature irrespective of the position of the sun with respect to the direction of movement of the vehicle.

3 Claims, 10 Drawing Sheets

Fig. 10

VEHICLE AIR CONDITIONER HAVING DRIVER AND PASSENGER UNITS WHICH OPERATE INDEPENDENTLY OF ONE ANOTHER

BACKGROUND OF THE INVENTION

1. Field of the Invention

The present invention relates to an air-conditioning device for a vehicle, which enables desired control of the temperature and the amount of the air discharged in relation to solar radiation in order to make the passengers more comfortable.

2. Description of the Related Art

An independent type air-conditioning apparatus has been known wherein separate temperature controllers are provided for both the driver's seat and the assistant driver's seat. This is called an "independent left/right control" type.

When the sun sits at one side of the vehicle in the direction of its movement, there is a difference in a thermal load not only between the driver's seat and the assistant driver's seat, but also between the right and left sides of the driver or assistant driver. This difference of the thermal load on one person makes him feel hot at only the side of his body facing the sun even with independent control of the temperature of the driver's seat and assistant driver's seat. Thus, ideal control of the temperature cannot be obtained.

SUMMARY OF THE INVENTION

An object of the present invention is to eliminate the above-mentioned difficulties in the prior art.

Another object of the present invention is to provide an air-conditioning apparatus for a vehicle capable of obtaining a desired conformity in the temperature felt by a driver or passenger at his right and left sides irrespective of the position of the sun.

According to the present invention, an air-conditioning apparatus for a vehicle is provided, comprising:

a blower for generating a flow of air;

an evaporator for cooling the flow of air;

heating means, arranged downstream from the evaporator, for controlling the temperature of the flow of the air;

a first duct arranged downstream from the heating means for receiving the flow of the air therefrom, the first duct having a first outlet opening to a cabin near the side of a seat adjacent to a lateral side of the vehicle;

a second duct arranged downstream from the heating means for receiving the flow of the air therefrom, the second duct having a second outlet opening to the cabin at another location near the side of the seat adjacent to the center of the cabin;

a sensor for detection of solar radiation on the vehicle to provide signals indicative of the position of the sun with respect to the vehicle, and;

means for controlling a difference in the cooling effect of the air between the first and second outlets so that the temperature difference felt is cancelled out irrespective of the position of the sun with respect to the vehicle.

DESCRIPTION OF THE PREFERRED EMBODIMENTS

Figure 1:
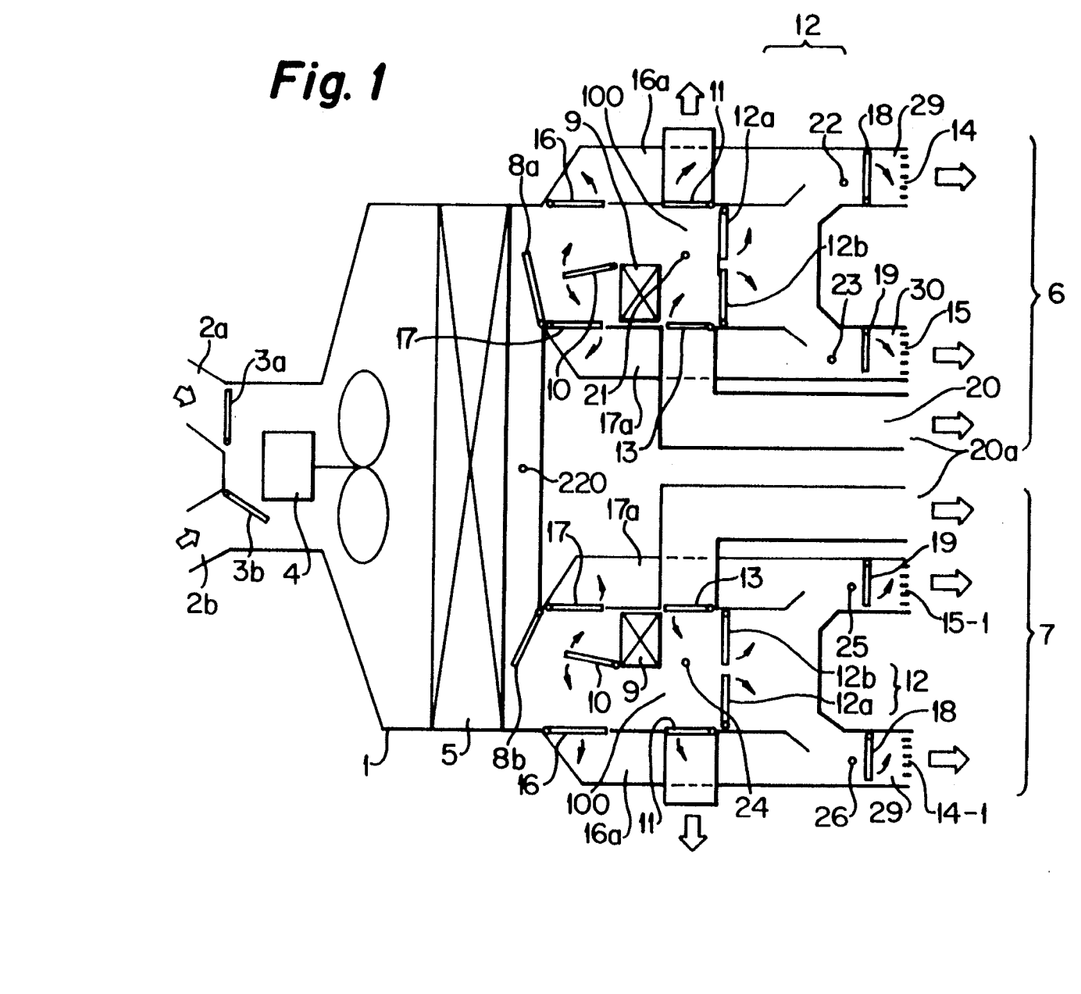
FIG. 1 is a general schematic view of an air-conditioning apparatus according to the present invention.

Referring to FIG. 1, reference numeral 1 denotes an air-conditioning unit for a vehicle with a right hand steering wheel. The idea of the present invention, however, can be naturally applied to a vehicle with a left hand steering wheel, as well. In this case, the terms "right" and "left" as used below should be read oppositely.

Switching doors 3a and 3b are provided at an inner air introduction passageway 2a and an outer air introduction passageway 2b, respectively, for controlling the ratio between the amounts of the air introduced into the unit 1 through the passageways 2a and 2b. The inner air introduction passageway 2a opens at its end remote from the door 3a to the cabin, while the outer air introduction passageway 2b opens at its end remote from the door 3b to the atmosphere. A blower 4 is arranged downstream from the door 3a and 3b for obtaining a forced flow of the air. Arranged downstream from the blower 4 is an evaporator 5 wherein a flow of cooling medium is created for a heat absorption operation for cooling the air contacting the evaporator 5. As is well known, the evaporator 5 is located in a recirculation passageway of a cooling medium for obtaining a refrigerating cycle.

According to this embodiment, independent temperature controllers are provided for the driver's seat and the assistant driver's seat. Namely, the air-conditioning unit 1 is provided at a position downstream from the evaporator 5 with a driver's seat side unit 6 and an assistant driver's seat side unit 7, which units 6 and 7 are parallel with each other. The units 6 and 7 are the same, except that they are arranged symmetrically. Thus, in order to avoid repetition, a detailed explanation will mainly be made of the driver's seat side unit 6. An explanation of the construction of the assistant driver's side unit 7 will be omitted except where necessary.

The driver's seat side unit 6 is provided with a door 8a for controlling the amount of air introduced into the unit 6. The door 8a is connected to a door 8b in the assistant driver's seat side unit 7 for controlling the amount of air introduced into the unit 7. A heater core 9 is arranged downstream from the door 8a. The heater core 9 has an inner passageway for cooling water from an internal combustion engine (not shown), which is subjected to heat exchange with the air passed through the heater core 9 for heating the air. An air mix door 10 is arranged upstream from the heater core 9. The air mix door 10 can control the amount of the air passed through the heater core 9 relative to the total amount of the air passed through the driver's side unit 6, i.e., the ratio between the amount of air passed through the heater core 10 and the amount of the air by-passing the heater core 9. The air passing through the heater core 9 and the air by-passing the heater core 9 are combined at a mixing chamber 100 before being discharged into the cabin, so a desired temperature of the combined gas is obtained by adjusting the degree of the opening of the air mix door 10, i.e., the amount of the air passed through the heater core 9.

A defroster door 11, a vent door 12 composed of vent door sections 12a and 12b, and a heat door 13 are arranged for selectively connecting the chamber 100 to air outlets which are connected to various locations inside the cabin. The defroster door 11, the vent door 12, and the heat door 13 have link mechanisms of well known constructions for operating the doors.

When the vent door 12 is open, the air is introduced into a side vent duct 29 and is discharged from a side air outlet 14 toward the right upper half part of the driver. The air is also introduced into a center vent duct 30 and discharged from a center air outlet 15 to the front upper half of the driver. Connected to the side air outlet 14 is a first cool air passageway 16a, which is opened, via a side cool air door 16, to the space inside the unit 1 at a position directly downstream from the evaporator 5. As a result, the cool air side door 16 can control the amount of the cool air introduced into the first cool air passageway 16a which is mixed with the air from the vent door 12 for controlling the amount of the air discharged from the side air outlet 14. Connected to the center air outlet 15 is a second cool air passageway 17a, which is opened, via a cooling air center door 17, to the space inside the unit 1 at a position downstream from the evaporator 5. As a result, the center cool air door 17 can control the amount of the cool air introduced into the second cool air passageway 17a which is mixed with the air from the vent door 12 for controlling the amount of the air discharged from the center air outlet 15. A hot air passageway 20 is further provided, which opens at its upstream end, via the heat door 13, to the space inside the unit 1 at a position directly downstream from the heater core 9. The other end of the hot air passageway 20 is connected to a hot air outlet 20a for discharging the hot air.

A side air flow control door 18 is arranged in the side vent duct 29 for controlling the amount of the air discharged from the side air outlet 14. A center air flow amount control door 19 is arranged in the center vent duct 30 for controlling the amount of the air discharged from the center air outlet 15.

A sensor 21 is arranged inside the driver's seat side unit 6 at a position directly downstream from the heater core 9 along a top end thereof. The sensor 21 is for detection of the temperature of the air adjusted by the degree of the opening of the air mix door 10. A side cool air sensor 22 is arranged inside the unit 6 at a position directly upstream from the side air flow control door 18 for detecting the temperature of the cool air from the side air outlet 14. A center cool air sensor 23 is for detecting the temperature of the cool air from the center air outlet 15. An evaporator downstream side sensor 220 is arranged directly downstream from the evaporator 5 for detecting the temperature of the cooling air just after the evaporator 5. It should be noted that, for the assistant driver's seat unit 7, sensors 24, 25, and 26 are also provided, which correspond to the sensors 21, 23, and 22, respectively in the unit 6.

Figure 2:
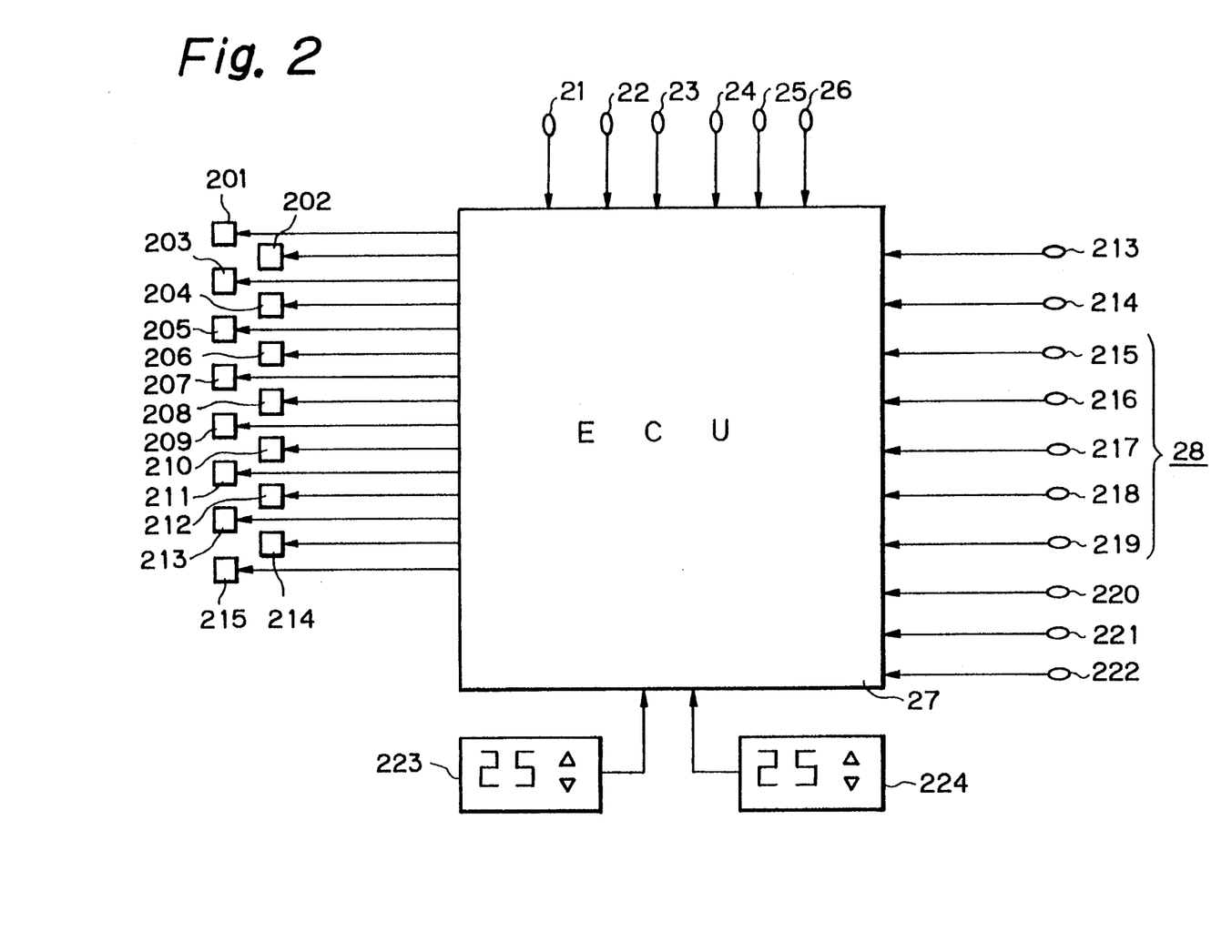
FIG. 2 is a diagrammatic view of a control circuit.

FIG. 2 illustrates an electronic control unit (ECU) 27 for receiving various sensor signals and for issuing signals to various actuators. The ECU 27 is constructed from a well known microcomputer system provided with a central processing unit (CPU), a read only memory (ROM), a random access memory (RAM), and an input and output interface. These are not shown in the drawings since they are well known elements. The sensors 21 to 26 in FIG. 1 are connected to the ECU 27 for inputting signals to the same. Other sensors 213 to 222, as will be described later, are connected to the ECU 27 for inputting signals to the same. The ECU 27 is connected to 15 actuators 201 to 215, as will be fully described later, for inputting signals to the actuators.

The sensor 213 is arranged adjacent to the assistant driver's seat for detecting the temperature of the air around the assistant driver. The sensor 214 is similarly arranged adjacent to the driver's seat for detecting the temperature of the air around the driver.

Figure 3:
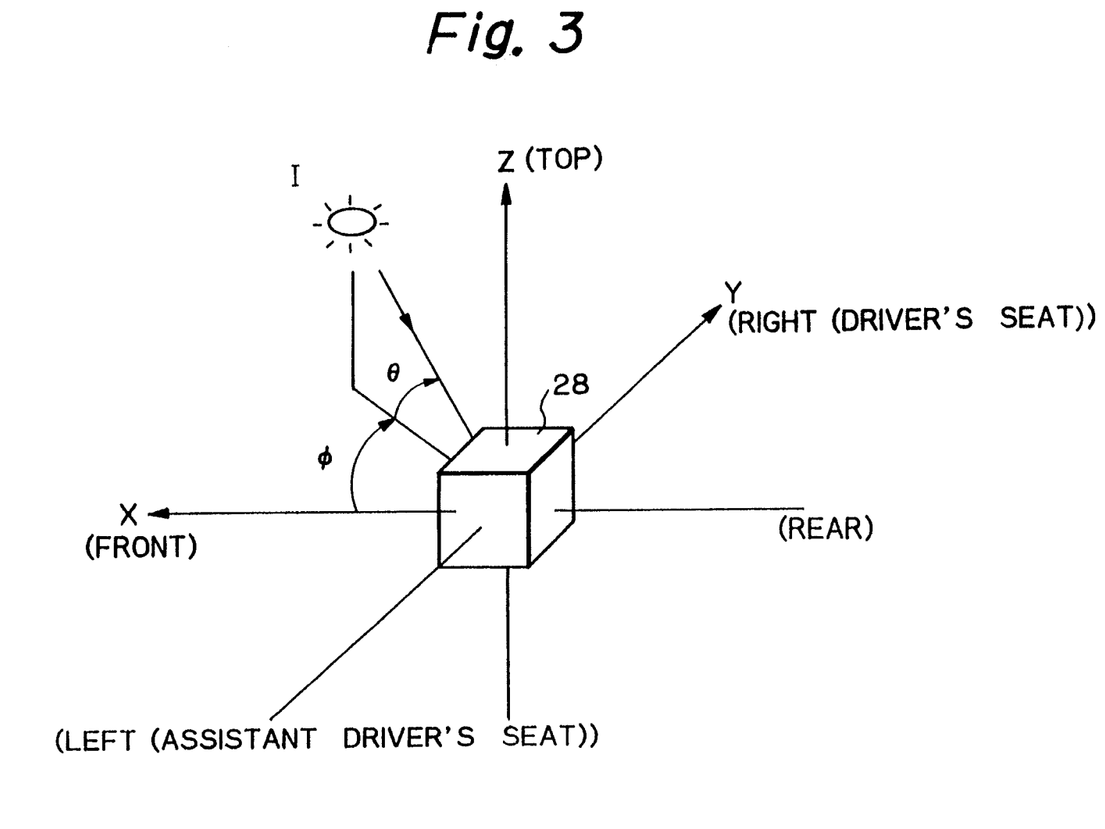
FIG. 3 is a perspective, diagrammatic view of a solar radiation sensor.

A solar radiation sensor 28 of substantially a cube shape (FIG. 3) is mounted on an inner panel of the body of the vehicle. The sensor has sensor sections on all the surfaces of the cube except the bottom. These sensor sections correspond to sensors 215 to 219. The sensors 215 to 219 detect the temperatures at the front, rear, left-hand, right-hand, and top sides of the cube in the direction of movement of the vehicle. FIG. 3 schematically illustrates a construction of the solar radiation sensor 28, wherein the direction of the movement of the vehicle is indicated by an arrow X. Thus, the driver's seat is located on the right side of the solar radiation sensor in a direction Y transverse to the direction X of the movement of the vehicle, while the assistant driver's seat is on the side of the sensor 28 opposite the driver's seat in the Y direction. The line Z shows the vertical direction. In FIG. 3, an angle $\phi$ is an azimuth angle of the sun I with respect to the direction X of movement of the vehicle. The angle $\phi$ has a zero value when the direction of the movement of the vehicle coincides with the direction of the sun I and has a positive value when measured in the direction of the driver's seat, i.e., the direction Y. An angle $\theta$ is an elevation of the sun I with respect to the horizontal plane including the directions X and Y.

Returning to FIG. 2, the sensor 220 (FIG. 1) is the evaporator rear sensor for detection of the temperature of the air after passing through the evaporator 5. The sensor (water temperature sensor) 221 is arranged on a conduit (not shown) for connecting the heater cores 9 to a cooling water jacket of the internal combustion engine (not shown) for detecting a temperature of the cooling water of the engine. The sensor (outside air temperature sensor) 222 is for detection of the temperature of the atmospheric air outside the vehicle.

A temperature setter (assistant driver's seat side temperature setter) 223 is provided in front of the assistant driver's seat for allowing an assistant driver to adjust the setting of the temperature at his seat. A temperature setter (driver's seat side temperature setter) 224 is provided in front of the driver's seat for allowing a driver to adjust the setting of the temperature at his seat.

These 12 sensors (assistant driver's seat air temperature sensor 213, driver's seat air temperature sensor 214, solar radiation sensor 28, evaporator rear sensor 220, engine cooling water sensor 221, atmospheric air sensor 222, air mix sensor 21, side cool air sensor 22, and center cool air sensor 23 at driver's seat unit 6, and air mix sensor 24, side cool air sensor 26, and center cool air sensor 25 at assistant driver's seat side unit 7) are connected to the ECU 27 for introducing the respective detecting signals to ECU 27. The temperature setters 223 and 224 at the assistant driver's seat and the driver's seat, respectively are connected to the ECU 27 for introducing the respective seat signals. The ECU 27 is also connected to 15 actuators 201 to 215 for issuing control signals for operating the same.

Next, details of these actuators will be explained. The servo motor 201 is connected to the inner-outer air switching doors 3a and 3b for operating the same. The servo motor 202 is connected to the air amount control doors 8a and 8b for operating the same. In the driver's seat unit 6, the servo motor 203 is for operating the air mix door 10, the servo motor 204 is for operating the side cool air door 16, the servo motor 205 is for operating the center cool air door 17, the servo motor 206 is for controlling, in cooperation, the defroster door 11, the vent door 12, and the heat door 13, the servo motor 207 is for operating the air amount controlling side door 18, and the servo motor 208 is for operating the air amount controlling center door 19.

In the assistant's seat side unit 7, the servo motor 209 is for operating the air mix door 10, the servo motor 210 is for operating the side cool air door 16, the servo motor 211 is for operating the center cool air door 17, the servo motor 212 is for controlling, in cooperation, the defroster door 11, the vent door 12, and the heat door 13, the servo motor 213 is for operating the air amount controlling side door 18, and the servo motor 214 is for operating the air amount controlling center door 19. Finally, the power transistor 215 is for operating the blower 4 in FIG. 2.

Figure 4A:
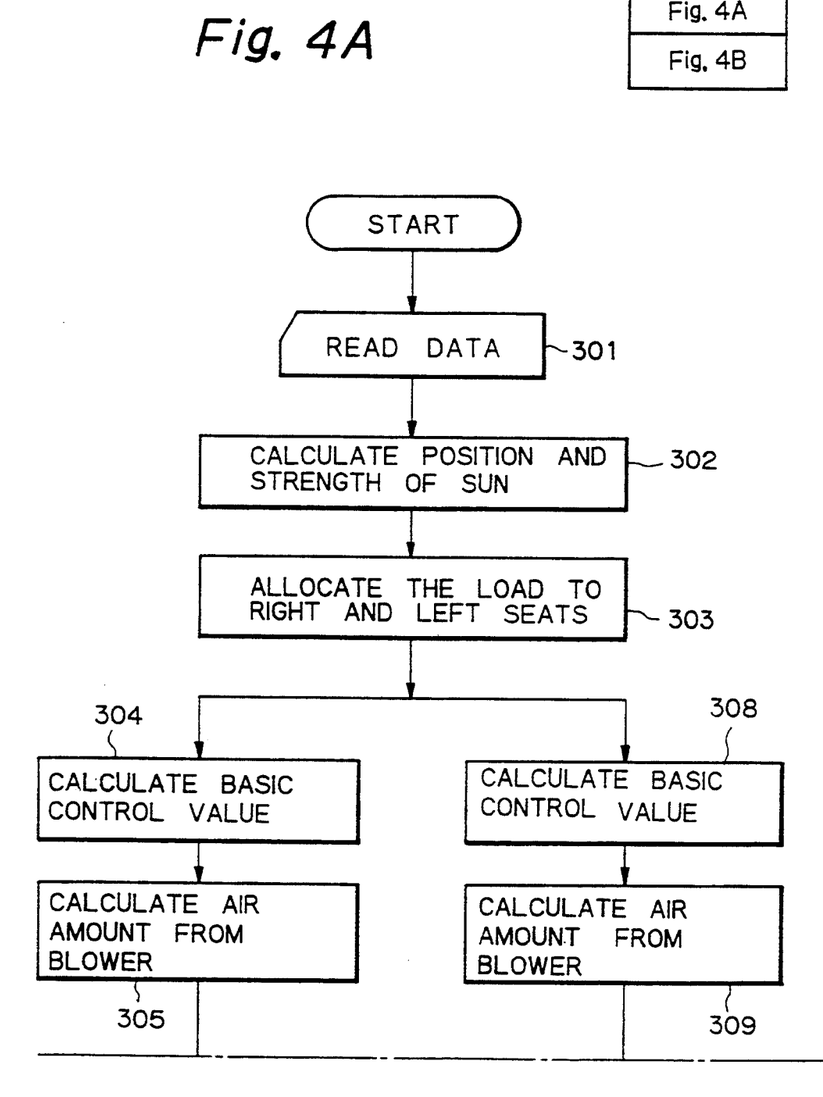
FIG. 4 is a flowchart of a main routine executed by the control circuit.
Figure 4B:
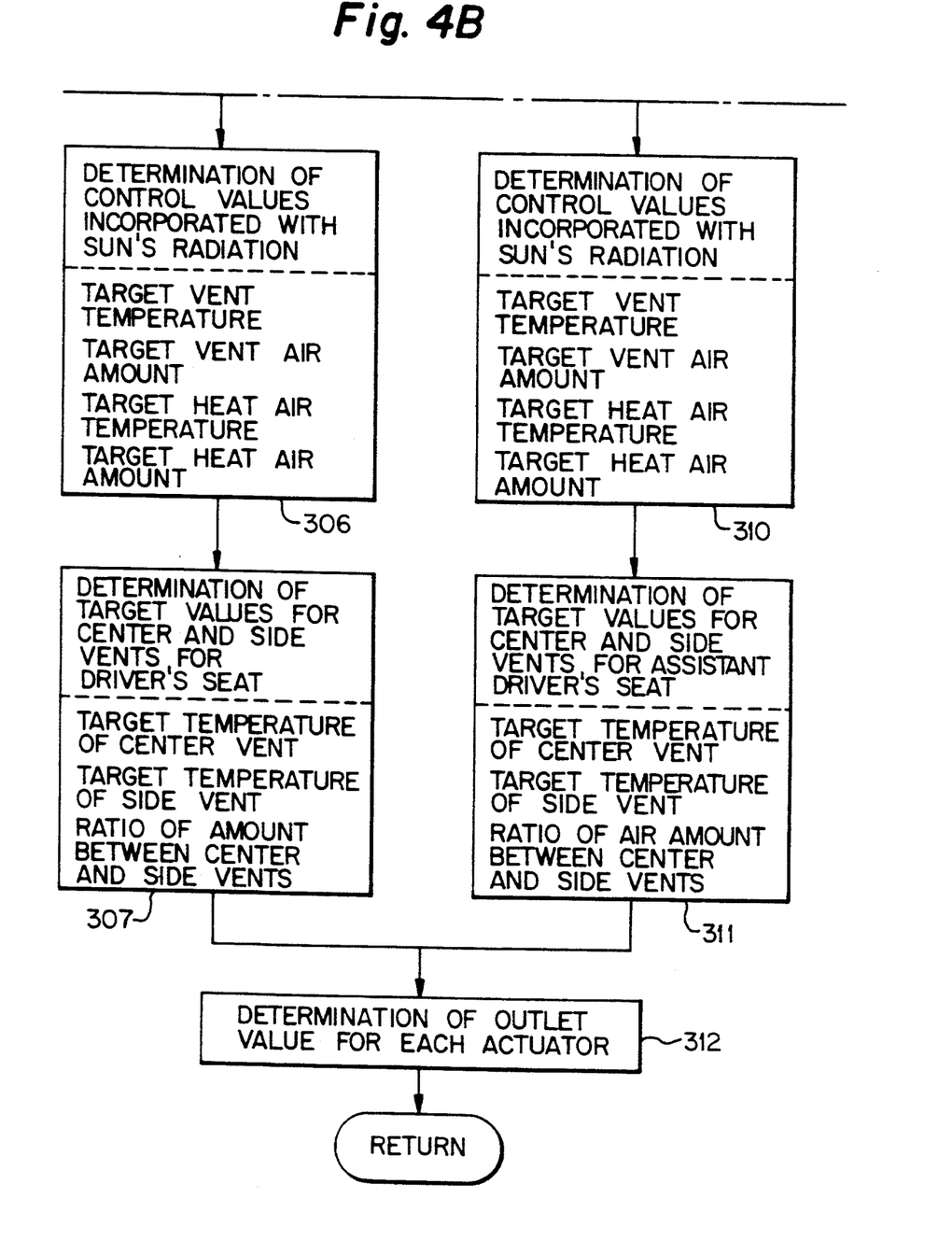

Next, the operation of the microcomputer in the ECU 27 will be explained by a flowchart in FIG. 4, some steps of which are explained in other flowcharts or tables. FIG. 4 generally illustrates a main routine performed by the microcomputer. The routine begins at step 301, where data from the various sensors 21 to 25 and 213 to 222 and the setters 223 and 224 are read out. At step 302, the position of the sun and the strength of the sunlight are calculated based on the signals from the five sensor sections 215 to 219 on the respective planes of the cubic-shaped solar radiation sensor 28.

Figure 5:
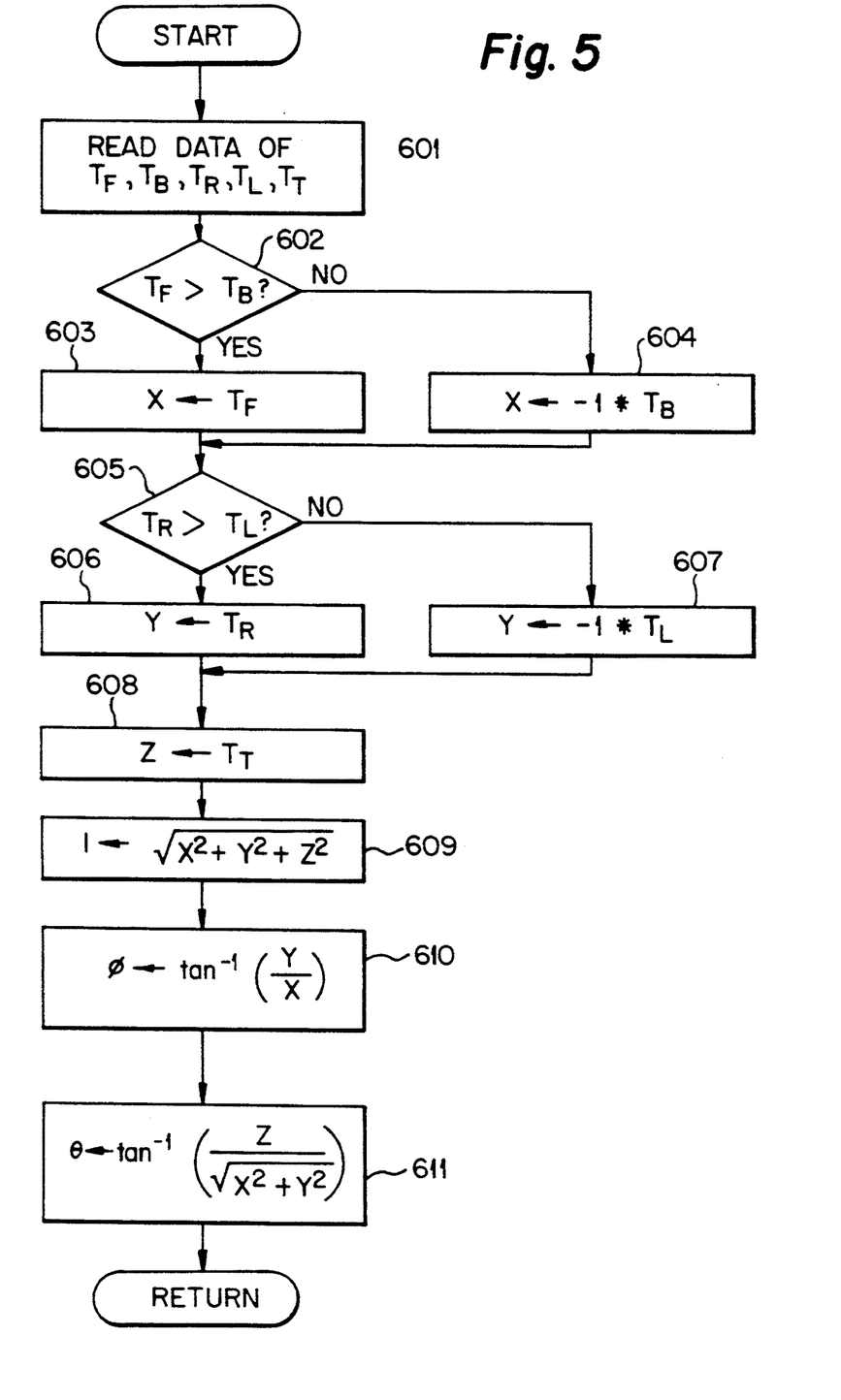
FIG. 5 is a detailed flowchart of step 302 in FIG. 4.

FIG. 5 illustrates details of step 302. First, at step 601, the strength of the incident light at the five surfaces detected by the sensor parts 215 to 219 of the solar radiation sensor 28 are read out. Namely, read out at step 601 are the value of strength of the sunlight $T_F$ detected at the front side, the value of the strength of the sunlight $T_B$ detected at the back side, the value of strength of the sunlight $T_L$ detected at the left side, the value of the strength of the sunlight $T_R$ detected at the right side, and the value of strength of the sunlight $T_T$ detected at the top side of the solar radiation sensor 28, with respect to the direction of movement of the vehicle. The detected values by these sensor parts 215 to 219 are all positive values.

At the following step 602, it is determined if the value of the strength of the sunlight $T_F$ detected by the front side is larger than the value of the strength of the sunlight $T_B$ detected by the back side. When it is determined that $T_F > T_B$, i.e., the sun I is located in front of the vehicle in the direction of movement of the vehicle, the routine goes to step 603, where the value of $T_F$ is used as an output in the X-axis direction. When it is determined that $T_F \leq T_B$, i.e., the sun I is located in back of the vehicle in the direction of movement of the vehicle, the routine goes to step 604, where the value of $T_B \times (-1)$ is used as the output in the X-axis direction. The reason why the sign is reversed when the sun is located at the back side of the vehicle is explained later.

At step 605, it is determined if the value of the strength of the sunlight $T_R$ detected by the right side is larger than the value of the strength of the sunlight $T_L$ detected at the left side. When it is determined that $T_R > T_L$, i.e., the sun I is located on the driver's (right) side, the routine goes to step 606, where the value of the strength of the sunlight $T_R$ detected at the right side is used as the output in the Y-axis direction. When it is determined that $T_R \leq T_L$, i.e., the sun I is located on the assistant driver's (left) side, the routine goes to step 607, where the value of $T_L \times (-1)$ is used as the output in the Y-axis direction. The reason why the sign is reversed when the sun is located on the assistant driver's side is explained later.

At step 608, the strength of the sunlight $T_T$ detected at the top side of the sensor 28 is used as the strength in the Z-axis direction.

At the following step 609, a solar radiation amount I is calculated based on the values of the output in the X-, Y-, and Z-directions. Namely, the solar radiation amount I corresponds to a vector constructed by the three components of the outputs X, Y, and Z and is calculated by $$\sqrt{X^2 + Y^2 + Z^2}$$

At step 610, the azimuth angle $\phi$ of the sun is calculated as a tangent of the component in the X-direction to the component in the Y-direction, thus, $$\phi = \tan^{-1}\frac{Y}{X}$$

At step 611, an angle of elevation 8 is calculated as a tangent of the component in the Z-axis direction to a vector constructed by the X- and Y-axis directions, by the following equation.

$$\phi = \tan^{-1}\frac{Z}{\sqrt{X^2 + Y^2}}$$

By multiplying $-1$ with $T_B$ and $T_L$ at steps 604 and 607, respectively, irrespective of the position of the sun with respect to the direction of movement of the vehicle, it is always possible to correctly know the position of the vehicle with respect to the sun. In this embodiment, with respect to the origin along the X-axis, the azimuth angle $\phi$ is determined so as to have a value in a range between 0° and 180° in the positive direction of the Y-axis and have a value in a range between $-180°$ and 0° in the negative direction of the Y-axis. Due to such a change in the sign, the value of $\tan \phi (=Y/X) > 0$ when $0° < \phi < 90°$ since $X > 0$ and $Y > 0$, while the value $\tan \phi (=Y/X) < 0$ when $90° < \phi < 180°$ since $X < 0$ and $Y > 0$, and the value of $\tan \phi(=Y/X) < 0$ when $-90° \leq \phi < 0°$, since $X > 0$ and $Y < 0$, while the value $\tan \phi(=Y/X) > 0$ when $-180° < \phi < -90°$ since $X < 0$ and $Y < 0$. As a result, in the range between 0° and 180°, the angle $\phi$ has a positive value, and in the range between 0° and $-180°$, the angle $\phi$ has a negative value.

Figure 6:
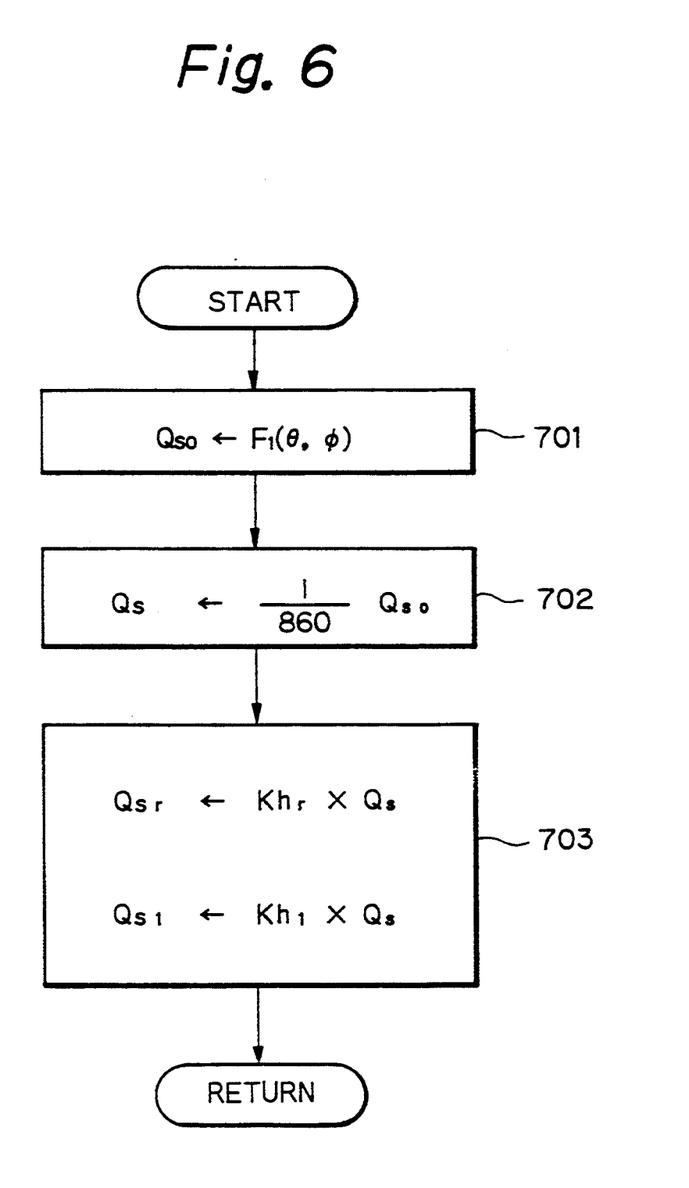
FIG. 6 is a detailed flowchart of step 303 in FIG. 4.

Returning to FIG. 4, at step 303, an increase in the total thermal load $Q_{S0}$ is calculated in accordance with the azimuth angle φ and the elevation angle Θ, and, based on the calculated increase $Q_{s0}$ in the total thermal load together with the azimuth angle φ and the elevation angle φ, the respective increases $Q_{sr}$ and $Q_{s1}$ in the thermal load for the driver's seat and the assistant driver's seat are calculated. Details of step 303 are shown in FIG. 6, which will be now explained with reference to Table 1. FIG. 6 shows a sub-routine for obtaining a control at step 303 in FIG. 4. In Table 1, a section (a) illustrates an increase in the thermal load created by the solar radiation on the vehicle with respect to the azimuth angle φ and the elevation angle Θ. In Table 1, a section (b) illustrates an allocation of the calculated increase in the thermal load to the driver's seat side in accordance with the azimuth angle φ and the elevation angle Θ, and a section (c) illustrates an allocation of the calculated increase in the thermal load to the assistant driver's seat side in accordance with the azimuth angle φ and the elevation angle Θ.

TABLE 1

Kw (kcal/h)

| θ | 0~ | 16~ | 31~ | 46~ | 61~ | 76~ | 91~ |
|---|---|---|---|---|---|---|---|
| (a) | | | | | | | |
| 0~ | 165 | 179 | 205 | 228 | 270 | 217 | 84 |
| 16~ | 302 | 300 | 326 | 352 | 409 | 380 | 303 |
| 31~ | 450 | 429 | 457 | 522 | 586 | 580 | 538 |
| 46~ | 599 | 602 | 637 | 706 | 716 | 710 | 663 |
| 61~ | 699 | 692 | 724 | 778 | 783 | 801 | 771 |
| 76~ | 631 | 602 | 619 | 655 | 672 | 707 | 697 |
| 90~ | 514 | 514 | 514 | 514 | 514 | 514 | 514 |
| (b) | | | | | | | |
| 0~ | 0.5 | 0.5 | 0.5 | 0.5 | 0.53 | 0.56 | 0.6 |
| 16~ | ↑ | ↑ | ↑ | ↑ | ↑ | ↑ | ↑ |
| 31~ | ↑ | ↑ | ↑ | ↑ | ↑ | ↑ | ↑ |
| 46~ | ↑ | ↑ | ↑ | ↑ | 0.57 | 0.64 | 0.7 |
| 61~ | ↑ | ↑ | ↑ | ↑ | 0.6 | 0.7 | 0.8 |
| 76~ | ↑ | ↑ | ↑ | ↑ | ↑ | ↑ | ↑ |
| 90~ | ↑ | ↑ | ↑ | ↑ | 0.5 | 0.5 | 0.5 |
| (c) | | | | | | | |
| 0~ | 0.5 | 0.5 | 0.5 | 0.5 | 0.47 | 0.44 | 0.4 |
| 16~ | ↑ | ↑ | ↑ | ↑ | ↑ | ↑ | ↑ |
| 31~ | ↑ | ↑ | ↑ | ↑ | ↑ | ↑ | ↑ |
| 46~ | ↑ | ↑ | ↑ | ↑ | 0.43 | 0.36 | 0.3 |
| 61~ | ↑ | ↑ | ↑ | ↑ | 0.4 | 0.3 | 0.2 |
| 76~ | ↑ | ↑ | ↑ | ↑ | ↑ | ↑ | ↑ |
| 90~ | ↑ | ↑ | ↑ | ↑ | 0.5 | 0.5 | 0.5 |

In FIG. 6, at step 701, the total increase $Q_{s0}$ (kcal/h) in the thermal load by the solar radiation is calculated from the Table 1-(a) in view of the sun's azimuth angle φ and the elevation angle Θ. It should be noted that the value of the total increase $Q_{s0}$ in Table 1-(a) is obtained when the strength of the solar radiation I is 860 kcal/m² h. Thus, at step 702, a conversion to an actual value of the total increase in the thermal load is carried out. Namely, the actual value in the total increase $Q_s$ (kcal/h) in the thermal load by the solar radiation is calculated from the $Q_{s0}$ obtained at step 701, multiplied by a ratio of the actual value of the total solar radiation I obtained at the step 302 in FIG. 4 to 860.

After the calculation of the increase $Q_s$ (kcal/h) in the thermal load corresponding to the actual amount of the solar radiation I, the increase $Q_s$ (kcal/h) in the thermal load is distributed to the driver's seat side thermal load increase $Q_{sr}$ and the assistant driver's side thermal load increase $Q_{s1}$. The values $Q_{sr}$ and $Q_{s1}$ are obtained from $Q_s$, multiplied by an allocation factor $Kh_r$ of the thermal load to the right side and an allocation factor $Kh_l$ of the thermal load to the left side, respectively, which are obtained from Table 1-(b) and (c) by using detected values of the azimuth angle φ and the elevation angle Θ.

It should be noted that the table sections (b) and (c) only show values of the allocation ratio at a region of φ ≧ 0, i.e., the sun is located on the driver's seat side with respect to the center axis of the vehicle. In other words, values of the allocation ratio at the region of φ < 0 are not shown. When φ < 0, i.e., the sun is located on the assistant driver's side, the sign of the azimuth angle φ is changed to plus, and, based on the value of the elevation angle Θ and the value of the azimuth angle φ of the changed sign, the value of the factor $Kh_l$ for allocation for the assistant driver's seat is obtained from Table 1-(b), and the value of the factor $Kh_r$ for allocation for the driver's seat is obtained from Table 1-(c).

Figure 7:
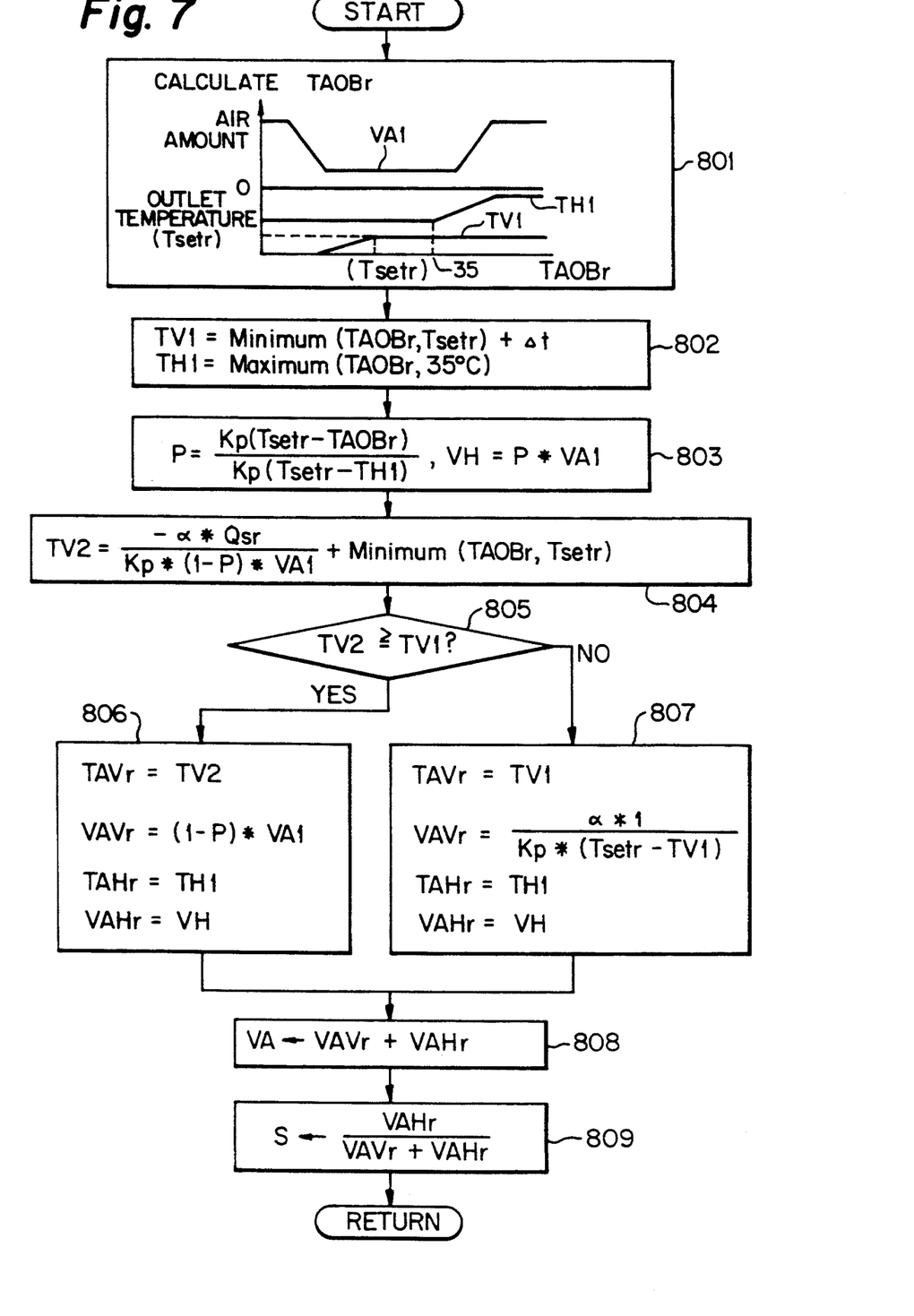
FIG. 7 is a detailed flowchart of steps 304 to 306 in FIG. 4.

Returning to FIG. 4, after the allocation to the increase in the thermal load to the driver's seat and the assistant driver's seat at step 303, a routine (step 304 to 307) for obtaining air-conditioning control for the driver's seat and a routine (steps 308 to 311) for obtaining air-conditioning for the asistant driver's seat are executed in parallel. First, the air-conditioning control for the driver's seat will be explained. At step 304, a basic control value with no consideration as to the solar radiation amount is calculated. At step 305, the flow amount from the blower 4 is calculated based on the calculated basic control amount. At step 306, control values with consideration of the solar radiation amount are calculated. Details of steps 304 to 306 will now be explained with reference to a sub-routine in FIG. 7. At step 801, the basic control amount TAOBr is calculated by $$TAOBr = K_{setr} \times T_{setr} - K_{rr} \times T_{rr} - K_{am} \times T_{am} + C \quad (1)$$

when $T_{setr}$ is a set temperature obtained by the driver's seat temperature setter 224, $T_{rr}$ is an inner air temperature sensed by the driver's seat air temperature sensor 214, $T_{am}$ is an outside air temperature sensed by the outside air temperature sensor 222, and $K_{setr}$, $K_{rr}$, $K_{am}$, and C are constants. Furthermore, at step 801, a target value VA1 for the total amount of the air discharged into the driver's seat by blower 4 is calculated in accordance with a pattern map as stored in the memory. The map is constructed by the values of the air flow amount to values of the TAOBr, and a map interpolation calculation is carried out to obtain a value of the total air flow amount with respect to the calculated value of TAOBr.

At the following step 802, provisional setting of a temperature TV1 of the air flow at the vent outlets 14 and 15 on the driver's seat side and a temperature TH₁ of the air flow at the heat outlet 20a on the driver's seat are carried out based on the basic control value TAOBr. Usually an air flow of too low a temperature directed to a leg part of person makes him less comfortable. Therefore, at this step, the temperature TH1 of the air flow at the heat outlet is controlled so that it has the lowest limit value of 35° C. It is, also, usual that an air flow of too high a temperature directed to an upper part of the body makes the person less comfortable. Therefore, at this step, the temperature TV1 of the air flow at the vent outlet is controlled so that it has the highest limit value of $T_{setr}$.

Figure 8:
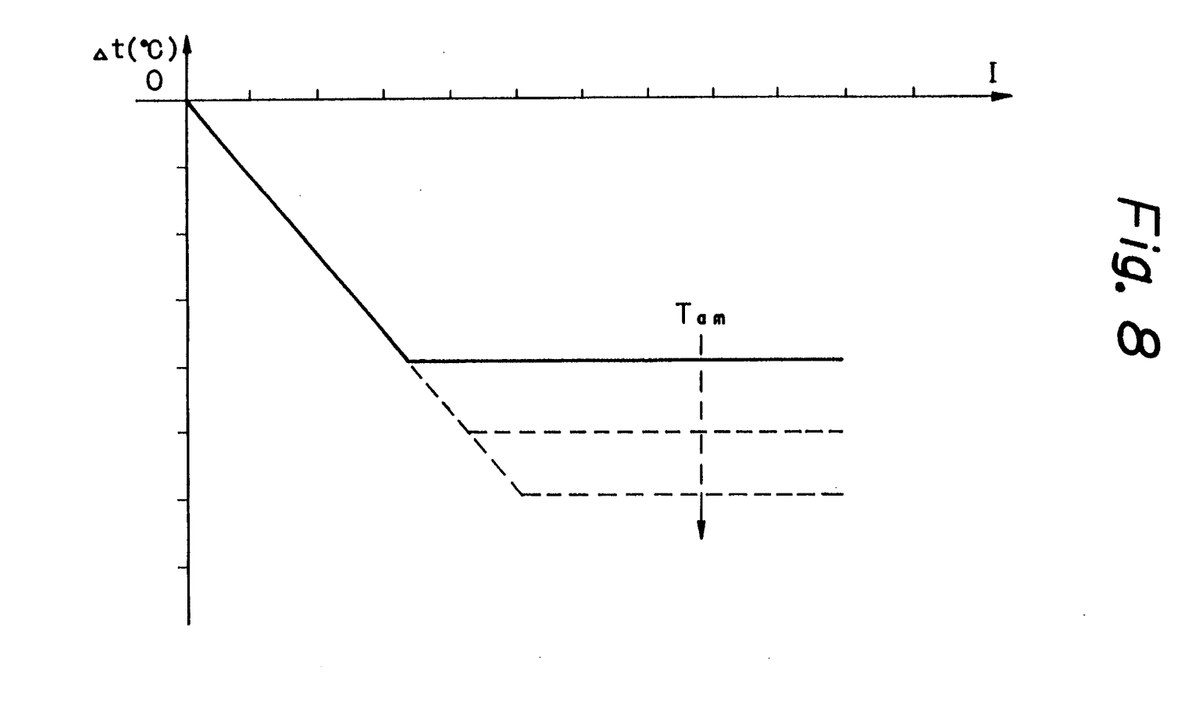
FIG. 8 shows the relationship between the strength of the solar radiation and a correction amount $\Delta t$ with respect to various values of the outside air temperature.

The lowest and highest limit of the TV1 and TH1 are determined at step 802 using following equations.

$$TV1 = Min(TAOBr, T_{setr}) + \Delta t \quad (2)$$

$$TH1 = Max(TAOBr, 35° C.) \quad (3)$$

where Δt is a correction amount in accordance with the solar radiation amount I and the outside air temperature $T_{am}$, the function Min takes the minimum value between TAOBr and $T_{setr}$, and the function Max takes the maximum value between TAOBr and 35° C. As will be understood from these equations, the air temperature TV1 at the vent outlet includes a correction amount in accordance with the solar radiation amount I and the outside air temperature $T_{am}$, so TV1 is provisionally set to cancel the increase in the cabin temperature caused by the solar radiation and the increase in the temperature felt by a passenger caused by the solar radiation. Such a correction amount Δt functions with respect to the solar radiation amount I and the outside air temperature $T_{am}$, as shown in FIG. 8. Namely, the higher the solar radiation amount I, the smaller the setting of the air temperature at the vent outlet TV1, which has negative values. Furthermore, as will be seen from FIG. 8, the larger the outside air temperature $T_{am}$, the lower the setting of the vent outlet air temperature TV1. This value of Δt is obtained empirically by varying and determining a temperature of the air as blown which make a passenger comfortable with respect to various solar radiation amounts and the outside air temperature under a stable operating condition of the air-conditioning unit 1 with its low flow setting. If the correction amount is smaller than the desired value of Δt, the decrease in the outlet air temperature is insufficient to counteract the solar radiation, which makes the passenger feel hot. Contrary to this, if the correction amount is larger than the desired value of Δt, the decrease in the outlet air temperature is excessive compared to the solar radiation, which makes the passenger feel cool. These situations make the passenger feel uncomfortable.

In FIG. 7, at step 803, an air amount distribution ratio P between the amount of air blown from the vent outlets 14 and 15 and the amount VH of the air blown from the heat outlet 20 is calculated by $$P = \frac{Kp \times (T_{setr} - TAOBr)}{Kp \times (T_{setr} - TH1)}, \text{ and} \quad (4)$$

$$VH = P \times VA1, \quad (5)$$

where $Kp = Cp \times \gamma$, Cp is the specific heat of the air, $\gamma$ is the specific weight of the air, and VA1 is the total amount of air as discharged to the driver's seat from the blower 4. The equation (4) corresponds to a ratio between the air amount from the vent outlet and the heat outlet while considering no solar radiation. Namely, P=0 corresponds to the vent mode wherein all of the air is blown from the vent outlets 14 and 15, P=1 corresponds to the heat mode wherein all the air is blown form the heat outlet 20, and 0<P<1 corresponds to a bi-level mode where the air is blown from both of the vent outlets 14 and 15 and the heat outlet 20.

At step 804, a vent outlet temperature TV2 is calculated by the following equation (6), which is for canceling the increase $Q_{sr}$ in the thermal load due to the solar radiation by the vent air amount which is obtained by an equation $(1-P) \times VA1$ (P is the air amount distribution ratio obtained at step 803):

$$TV2 = \frac{-\alpha \times Q_{sr}}{Kp(1-P)VA1} + \text{Min}(TAOBr, T_{setr}), \quad (6)$$

where α is constant determined by various preference factors, such as total volume of the space of the vehicle to be air-conditioned and a total area of windows of the vehicle.

According to this embodiment, the provisional setting of the vent outlet temperature TV1 obtained at step 802 is the minimum value of the vent outlet temperature. When the vent outlet temperature TV2 obtained at step 804 by the equation (6) is larger than the value of TV1, TV2 rather than TV1 is used for canceling the thermal load caused by the solar radiation. Contrary to this, when the vent outlet temperature TV2 obtained at step 804 by the equation (6) is smaller than the value of TV1, TV1 is the lowest limit of the vent outlet temperature for canceling the thermal load caused by the solar radiation. Namely, the vent air temperature TV2 obtained at step 804 by the equation (6) is a value of the vent air temperature which can cancel the increase $Q_{sr}$ in the thermal load caused by the solar radiation with the amount of the air of $(1-P) \times VA1$.

At step 805, it is determined if the vent outlet air temperature TV2 for canceling an increase $Q_{sr}$ in the thermal load due to the solar radiation is equal to or larger than the provisional setting of the vent air outlet temperature TV1. When it is determined that TV2≧TV1, i.e., the increase $Q_{sr}$ in the thermal load due to the solar radiation I is larger than the provisional setting TV1 at step 802, the routine goes to step 806, where a final vent outlet air temperature TAVr is determined as the value of TV2, and a final vent air outlet amount VAVr is determined as $(1-P) \times VA1$. In addition, at step 806, a final heat outlet temperature TAHr is determined as TH1, and a final heat outlet air amount VAHr is determined as VH.

When it is determined that TV2<TV1 at step 805, i.e., the increase $Q_{sr}$ in the thermal load due to the solar radiation I is smaller than the provisional setting TV1 at step 802, the routine goes to step 807, where a final vent outlet air temperature TAVr is determined as the value of TV1, and a final vent air outlet amount VAVr is determined by:

$$VAVr = \frac{\alpha \times I}{Kp \times (T_{setr} - TV1)} \quad (7)$$

The value of the vent outlet amount calculated by this equation (7) corresponds to the air outlet amount, which can cancel a part of the increase $Q_{sr}$ in the thermal load, which part cannot be cancelled by the air of the temperature of TV1 from the vent outlet. Similar to step 806, at step 807, a final heat outlet temperature TAHr is determined as TH1, and a final heat outlet air amount VAHr is determined as VH.

At the following step 808, the total amount of the air VA at the driver's seat by the blower 4 is calculated based on the final vent outlet flow amount VAVr and the heat outlet flow amount VAHr, using the following equation:

$$VA = VAVr + VAHr \quad (8)$$

At step 809, a degree of the opening S of the heat door 13 is calculated by the following equation:

$$S = \frac{VAHr}{VAVr + VAHr} \quad (9)$$

This equation means that, when S=0, a complete vent mode is obtained, wherein all of the air in the driver's seat side unit 6 is blown from the vent outlets 14 and 15, and when S=1, a complete heat mode is obtained, wherein the all of the air in the driver's seat side unit 6 is blown from the heat outlet 20. When $0<S<1$, a bi-level mode is obtained, wherein the air is blown both from the vent outlets 14 and 15 and heat outlet 20. The ratio between the amount from the vent outlet and the amount from the heat outlet is varied in accordance with the value of S.

Returning to FIG. 4, after the execution of steps 305 and 306, as described in detail, the routine goes to step 307, where a temperature and an amount of the air issued from the side air outlet 14 and the center air outlet 15 (FIG. 1) are calculated. Namely, based on the driver's seat side set temperature $T_{setr}$, the driver's seat vent outlet air temperature TAVr, and the driver's seat vent outlet air amount VAVr, an air temperature $TAV_{rs}$ at the side vent outlet 14 for the driver's seat, an air amount $VAV_{rs}$, at the side vent outlet 14 for the driver's seat, an air temperature $TAV_{rc}$ at the center vent outlet 15 for the driver's seat, and an air amount $VAV_{rc}$ at the center vent outlet 15 for the driver's seat are calculated by the following equations (10) to (13):

$$TAV_{rs} = TAVr + \Delta T_{rs}(°C.) \quad (10)$$
$$VAV_{rs} = K_{rs} \times VAVr (m^3/h) \quad (11)$$
$$TAV_{rc} = TAVr(°C.) \quad (12)$$

$$VAV_{rc} = \frac{(T_{setr} - TAVr) \times VAVr - (T_{setr} - TAV_{rs}) \times VAV_{rs}}{T_{setr} - TAVr} (m^3/h) \quad (13)$$

Figure 9:
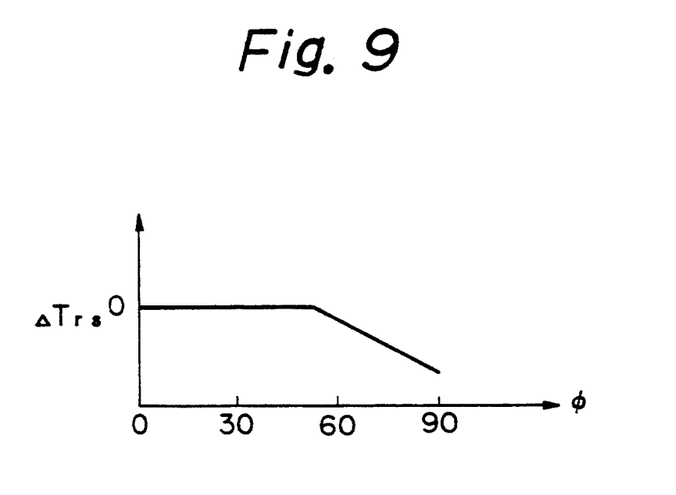
FIG. 9 shows the relationship between a sun's azimuth angle $\phi$ and the correction amount $\Delta T_{rs}$.

In equation (10), the $\Delta T_{rs}$ is a correction amount indicating the decrease in the temperature of the air discharged from the side vent outlet 14 (the target temperature $TAV_{rs}$ at the side vent outlet at the driver's seat) in accordance with the sun's azimuth angle $\phi$. As shown in FIG. 9, the value of the correction amount $\Delta T_{rs}$ is zero in a range of the sun's azimuth angle $\phi$ between 0° to 50°. Namely, at the range of the sun's azimuth angle $\phi$ between 0° to 50°, no correction is made as to the target temperature $TAV_{rs}$ at the side vent outlet 14 at the driver's seat. When the sun's azimuth angle $\phi$ is between 50° to 90°, i.e., the sun is located on the front, right side of the vehicle or just beside the vehicle, the nearer the value of the sun's azimuth angle $\phi$ to 90°, the smaller the negative value of the correction amount $\Delta T_{rs}$. As a result, the nearer the value of the sun's azimuth angle to 90°, the lower the temperature $TAV_{rs}$ of the air at the side vent outlet 14 in the driver's seat. Even in such a case, where the sun is located just beside the vehicle, the temperature of the air $TAV_{rc}$ at the center vent air outlet 15 in the driver's seat obtained by equation (12) is maintained unchanged as the value of the target air temperature TAVr in the vent outlet at the driver's seat.

Figure 10:
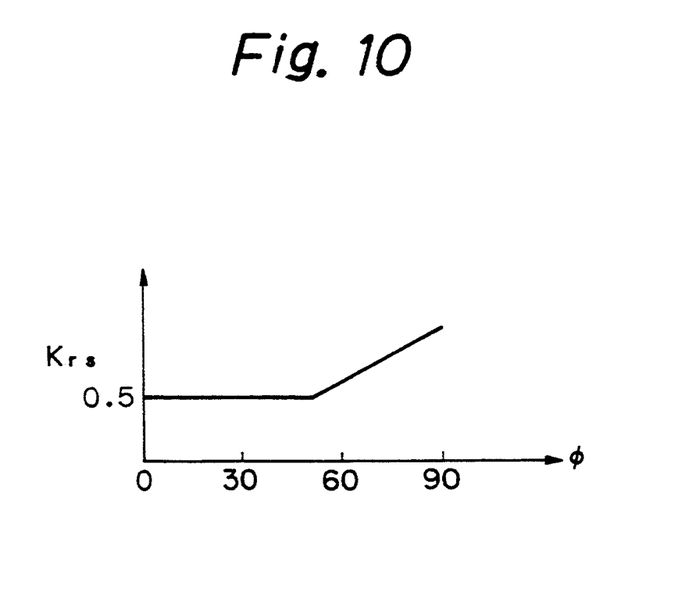
FIG. 10 shows the relationship between a sun's azimuth angle $\phi$ and the correction amount $K_{rs}$.

The reason why the air outlet temperature $TAV_{rs}$ at the side vent in the driver's seat upon the range of the sun's azimuth angle $\phi$ between 50° to 90° is decreased will now be explained. In the range of the sun's azimuth angle $\phi$ between 50° to 90°, the driver is subjected to strong solar radiation on his right upper body via a side window pane (not shown in the drawing). In order to prevent the driver from feeling hot, only the target temperature $TAV_{rs}$ of air in the side vent outlet 14 is decreased, and no correction is made for the target air temperature $TAV_{rc}$ at the center vent 15 of the driver's seat side. It should be noted that, in a range of the sun's azimuth angle $\phi$ larger than 90°, the correction amount $\Delta T_{rs}$ may have a fixed value obtained at the sun's azimuth angle $\phi$ of the value of 90° or may have a value which increases along with the increase in the sun's azimuth angle $\phi$. In equation (11), the constant $K_{rs}$ is a constant for determining the amount of the air discharged from the side air outlet 14 (an amount of air VAV from the side vent at the driver's seat) in accordance with the suns azimuth angle $\phi$. As shown in FIG. 10, the value of $K_{rs}$ has a fixed value of 0.5 when the azimuth angle $\phi$ is in a range between 0° to about 50° in the right and left hand sides. Namely, under this range of the azimuth angle $\phi$, the same amount of the air, i.e., a half value of the vent outlet air amount VAVr, is blown from both of the side air outlet 14 and the center air outlet 15.

When the azimuth angle $\phi$ is in a range between 50° to about 90°, i.e., the sun is located on the right front side of the vehicle or is located just beside the vehicle in the direction of movement thereof, the nearer the value of the sun's azimuth angle $\phi$ to 90°, the higher the value of the constant $K_{rs}$ in the range of the value between 0.5 to 1.0. Namely, the value of the air amount $VAV_{rs}$ ($=K_{rs} \times VAVr$) at the side vent outlet 14 at the driver's seat is larger than that when the azimuth angle $\phi$ is in a range between 0° to 50°. Namely, the value of the air amount $VAV_{rs}$ at the side vent outlet is larger than the half of the total vent air outlet amount VAVr at the driver's seat. It should be noted that the value of the constant $K_{rs}$ when the azimuth angle $\phi$ is larger than 90° may be equal to the value obtained at $\phi=90°$ or may be increased in accordance with an increase in the value of the sun's azimuth angle $\phi$. As far as the air amount $VAV_{rc}$ at the center vent outlet 15 at the driver's seat is concerned, the equation (13) is used to obtain it. This equation is for obtaining a heat balance between the side vent outlet 14 and center bent outlet 15.

Returning to FIG. 4, similar to steps 304 to 307 as described fully above, steps 308 to 311 are carried out for controlling various amounts for the target air temperature at the vent outlet, the target amount of the air at the vent outlet, the target air temperature at the heat outlet, the target amount of the air at the heat outlet, the target temperature at the center vent outlet 15-1, the target temperature at the side vent outlet 14-1, and the ratio of the amount between the center outlet and side outlet. These steps are similar to those at steps 304 to 307, and therefore the detailed explanation thereof will be omitted.

Calculations of the control values for both of the driver's seat and the assistant driver's seat are carried out at step 312, and various signals are issued to the respective actuators so that the control values used as target values are obtained. Details of such control will now be explained. First, a total air amount $VA_{att}$ from the blower 4 in the air-conditioning device 1 is calculated, which is a sum of the flow amount directed to the driver's seat unit 6, VAVr+VAHr, and the flow amount directed to the assistant driver's seat unit 7, VAV1+VAH1. A control signal corresponding to this total air amount $VA_{att}$ is issued to the power transistor 215 (FIG. 2).

Second, a ratio of the air amount to the driver's seat unit 6, VAVr+VAHr, and the air amount to the total air amount, $VA_{att}$ is calculated, and, in accordance with this ratio, a signal is issued to the actuator 202 for driving the flow amount control doors 8a and 8b, so that the desired allocation of the air flow amount between the driver's seat and the assistant driver's seat is obtained.

Then, a ratio between the air amount to the driver's seat, VAVr+VAHr and the air amount to the foot part at the driver's seat, VAHr, is calculated. In accordance with this ratio, a signal is obtained which is introduced into the actuator 206 for controlling an allocation of the air amount between the defroster door 11, the vent door 12, and the heat door 13 at the driver's seat. As far as the distribution of the air between the top and bottom parts of the assistant driver's seat is concerned, a ratio between the air amount to the assistant driver's seat, VAV1+VAH1, and the air amount to the foot part at the assistant driver's seat, VAH1, is calculated. In accordance with this ratio, a signal is obtained which is introduced into the actuator 212 for controlling an allocation of the air amount between the defroster door 11, the vent door 12, and the heat door 13 in the assistant driver's seat.

A ratio is, then, calculated between the amount of the air at the side vent outlet 14 for the driver's seat, $AV_{rs}$, and the total amount of the air at the vent outlets 14 and 15 for the driver's seat, $VAV_{rs}+VAV_{rc}$. Based on this ratio, a signal is issued to the actuators 208 and 209 for operating the side door 18 for controlling the air amount and the center door 19 for controlling the air amount, so that the desired allocation of the air flow amount is obtained between the side vent outlet 14 and the center vent outlet 15. Regarding the control of the air flow amount from the side vent outlet 14-1 and the center vent outlet 15-1 for the assistant driver's seat, substantially the same control is carried out. Namely, a ratio is, then, calculated between the amount of the air at the side vent outlet for the assistant driver's seat, $VAV_{1s}$, and the total amount of the air at the vent outlet for the assistant driver's seat, $VAV_{1s}+VAV_{1c}$. Based on this ratio, a signal is issued to the actuators 213 and 214 for operating the side door 18 for controlling the air amount and the center door 19 for controlling the air amount, so that the desired allocation of the air flow amount is obtained between the side vent outlet 14-1 and the center vent outlet 15-1.

The operation of the cool air side door 16 at the driver's seat is controlled under PI (proportional-integral) mode based on a deviation between the temperature sensed by the cool air side sensor 22 and the side vent outlet air temperature $TAV_{rs}$ at the driver's seat calculated by equation (10). Similarly, the operation of the cool air center door 17 at the driver's seat is controlled under the PI mode based on a deviation between the temperature sensed by the cool air center sensor 23 and the center vent outlet air temperature $TAV_{rc}$ at the driver's seat calculated by equation (12).

The operation of the cool air side door 16 at the assistant driver's seat is similarly controlled under the PI mode based on a deviation of the temperature sensed by the cool air side sensor 26 and the side vent outlet air temperature $TAV_{1s}$ at the driver's seat calculated at step 311 in FIG. 4 by a similar equation to equation (10). Similarly, the operation of the cool air center door 17 at the assistant driver's seat is controlled under the PI mode based on a deviation of the temperature sensed by the cool air center sensor 25 and the center vent outlet air temperature $TAV_{1c}$ at the driver's seat calculated at the step 311 by a equation similar to equation (12).

Finally, the operation of the air mix door 10 at the driver's seat in carried out by means of PI control in accordance with a deviation of the temperature sensed by the air mix sensor 21 and the target temperature as calculated, and the operation of the air mix door 10 at the assistant driver's seat is carried out by means of PI control in accordance with a deviation of the temperature sensed by the air mix sensor 24 and the target temperature as calculated.

According to the embodiment as described above, in addition to the difference in the temperature between the driver's seat and the assistant driver's seat, a difference in the temperature is created between the left hand and right hand sides at each of the driver's seat and the assistant driver's seat based on the position of the sun and the intensity of the sunlight, which allows hotness which would otherwise be felt by a passenger when solar radiation comes in laterally in the vehicle to be cancelled.

According to the embodiment, the vent temperature TV2 for canceling the increase in the thermal load to the vehicle by the solar radiation is compared with the lowest set temperature TV1 of the vent outlet temperature, and when it is determined that TV1>TV2, the value TV1 as the vent air outlet temperature is selected in place of TV2, so that a remaining part in the increase in the thermal load, which can not be cancelled by the outlet temperature TV1, is cancelled by increasing the outlet air amount, which prevents the passengers from feeling excessively cold, while canceling the remaining part in increase in the thermal load.

While embodiments of the present invention were described with reference to the attached drawings, many modifications and changes can be made by those skilled in this art without departing from the scope and spirit of the present invention.

claim:

1. An air-conditioning apparatus for a vehicle comprising:

blower means for generating a flow of air;

evaporator means for cooling the flow of air;

first unit means for controlling a temperature at a location adjacent to a driver seat;

second unit means for controlling a temperature at a location adjacent to an assistant driver seat, said first and second unit means independently controlling a cooling effect of the driver seat and assistant driver seat, respectively;

said first unit means comprising:

first heating means, arranged downstream from the evaporator means, for controlling a temperature of the flow of air, first duct means arranged downstream from the first heating means for receiving the flow of air therefrom, the first duct means having a first outlet opened to a cabin of the vehicle at a first location near a side of the driver seat adjacent to a first lateral side of the vehicle, and second duct means arranged downstream from the first heating means for receiving the flow of air therefrom, the second duct means having a second outlet opened to the cabin at a second location near a side of the driver seat adjacent to a center of the cabin;

said second unit means comprising:

second heating means, arranged downstream from the evaporator means, for controlling a temperature of the flow of air, third duct means arranged downstream from the second heating means for receiving the flow of air therefrom, the third duct means having a third outlet opened to the cabin at a third location near a side of the assistant driver seat adjacent to a second lateral side of the vehicle, and fourth duct means arranged downstream from the second heating means for receiving the flow of air therefrom, the fourth duct means having a fourth outlet opened to the cabin at a fourth location near a side of the assistant driver seat adjacent to the center of the cabin;

sensor means for detecting solar radiation on the vehicle to provide signals indicative of a position of the sun with respect to the vehicle;

means for allocating an amount of air between the first and second unit means in accordance with the detected position of the sun with respect to the direction of the movement of the vehicle;

first control means for controlling a difference in cooling effect between the first and second outlets using the allocated amount of air to the first unit means so that a temperature difference felt by a passenger in the driver seat is cancelled irrespective of the position of the sun with respect to the vehicle; and second control means for controlling a difference in cooling effect between the third and fourth outlets using the allocated amount of air to the second unit means so that a temperature difference felt by a passenger in the assistant driver seat is cancelled irrespective of the position of the sun with respect to the vehicle.

2. An air-conditioning apparatus according to claim 1, wherein said first control means includes means, based on the detected sun's position, for calculating a first desired difference in temperature between air issued from the first and second outlets, and means for introducing an amount of air by-passing the first heating means to the first duct means for obtaining the first desired temperature difference of air issued from the first and second outlets; and wherein said second control means includes means, based on the detected sun's position, for calculating a second desired difference in temperature between air issued from the third and fourth outlets, and means to the third duct means for introducing an amount of air by-passing the second heating means to the third duct means for obtaining the second desired temperature difference of air issued from the third and fourth outlets.

3. An air-conditioning apparatus according to claim 1, wherein the first control means further comprises first air amount control means for controlling an allocation of an amount of air between the first and second duct means, means, based on the detected sun's position, for calculating a first desired difference in an air amount issued from the first and second outlets, and means for providing a signal directed to said first air amount control means for obtaining the first desired difference in the air amount issued from the first and second outlets, wherein said first air amount controlling means is capable of controlling the air amount between the first and second duct means without substantially influencing the amount of air flowing in the second unit means, and wherein the second control means further comprises second air amount control means for controlling the allocation of an amount of air between the third and fourth duct means, means, based on the detected sun's position, for calculating a second desired difference in an air amount issued from the third and fourth outlets, and means for providing a signal directed to the second air amount control means for obtaining the second desired difference in air amount between the third and fourth outlets, said second air amount controlling means is capable of controlling the air amount between the third and fourth duct means without substantially influencing the amount of air flowing in the first unit means.

* * * * *